United States Patent [19]
Antonelli et al.

[11] 3,878,126
[45] *Apr. 15, 1975

[54] CATALYSTS FOR OXIDIZING ETHYLENE TO ETHYLENE OXIDE

[75] Inventors: Giambattista Antonelli, Brugherio; Natale Ferlazzo; Giancarlo Aglietti, both of Milan, all of Italy

[73] Assignee: Societa' Italiana Resine S.I.R. S.P.A., Milan, Italy

[ * ] Notice: The portion of the term of this patent subsequent to Dec. 25, 1990, has been disclaimed.

[22] Filed: Oct. 27, 1972

[21] Appl. No.: 301,399

[30] Foreign Application Priority Data
Nov. 17, 1971 Italy.................................. 31199/71

[52] U.S. Cl............ 252/447; 252/463; 252/466 PT; 252/476
[51] Int. Cl.............................................. B01j 11/08
[58] Field of Search....... 252/447, 466 PT, 476, 463

[56] References Cited
UNITED STATES PATENTS

| | | | |
|---|---|---|---|
| 2,040,782 | 5/1936 | Van Peski...................... | 252/476 X |
| 2,477,435 | 7/1949 | Aries.............................. | 252/476 X |
| 3,781,224 | 12/1973 | Ferlazzo et al. ................ | 252/476 X |

*Primary Examiner*—Winston A. Douglas
*Assistant Examiner*—W. J. Shine
*Attorney, Agent, or Firm*—Sughrue, Rothwell, Mion, Zinn and Macpeak

[57] ABSTRACT

In the production of silver-based supported catalysts for the oxidation of ethylene to ethylene oxide, the gases evolved during heating to decompose the silver salts used to impregnate the support are recycled through the catalyst together with nitrogen and then nitrogen containing oxygen.

5 Claims, No Drawings

CATALYSTS FOR OXIDIZING ETHYLENE TO ETHYLENE OXIDE

The present invention relates to silver based catalysts used in the production of ethylene oxide by oxidation of ethylene at elevated temperature in the presence of oxygen or gases containing molecular oxygen.

In particular, the present invention relates to a process for the activation of such catalysts.

It is already known that in the production of ethylene oxide by oxidation of ethylene at elevated temperature, silver based catalysts are used. These catalysts essentially consist of a thin layer of silver, possibly in combination with minor quantities of metals of the platinum, gold, palladium, barium, calcium type, covering an inert support of granular form.

In industry, silver based catalysts for the production of ethylene oxide are normally prepared by impregnation of the inert support with solutions or suspensions of thermally decomposable compounds of catalytically active metals and subsequent thermal decomposition of these compounds on the support.

Decomposition is normally carried out in the presence of air at a temperature comprised in the range from 250° to 400°C.

The main requisites which a catalyst must have to be conveniently used in a process of an industrial type are the highest possible activity and selectivity in the reaction for which it is used and a high mechanical strength so that the characteristics of the catalyst remain as constant as possible during the period in question.

It is well known that these requirements of catalysts, particularly of supported catalysts, depend both on the materials used and on the method of preparing the catalyst, each phase of which affects the characteristics. A problem which is constantly present in the industry with respect to catalysts is that of increasing the activity, selectivity and mechanical strength of these catalysts.

Nevertheless, it often happens that the changes made in materials used or in the method of preparing the catalyst in order to enhance one of these requirements have a negative effect on the others.

For example, it is possible to raise the activity of a catalyst by increasing its surface area but often this results in a lessening of the mechanical properties of the catalyst.

Our previous patent application No. 196,201 of Nov. 5, 1971, now U.S. Pat. No. 3,781,224 described a method of preparing a silver-based supported catalyst useful in the oxidation of ethylene at elevated temperature in the presence of oxygen, by which the said catalyst is given a high mechanical strength without its activity being negatively influenced. This process consists essentially in treating thermally for definite periods of time the products obtained after impregnation of an inert support with solutions or suspensions of decomposable compounds of silver and possibly other catalytically active metals, followed by drying, initially in the presence of a gas consisting of nitrogen and subsequently in the presence of gaseous mixtures of nitrogen and oxygen with an ever increasing proportion of oxygen. This process makes it possible to increase the mechanical strength of the catalyst while its activity and selectivity requirements remain unchanged.

It has now been found possible to increase either the activity or the mechanical strength of silver-based supported catalysts which are useful in gaseous phase oxidation of ethylene into its corresponding oxide, by using a simple and economically satisfactory preparation process. Essentially, this process consists in impregnating an inert support with solutions or suspensions of decomposable compounds of silver and possibly other catalytically active metals, subsequently drying it, and subjecting the resulting product to a thermal treatment during which the gaseous products which develop from decomposition of the decomposable silver salts are recycled continuously through the particles of the catalyst being produced.

More precisely, the product emanating from the drying stage is treated thermally at a temperature of 270° to 350°C, firstly in an inert gas atmosphere and then in the presence of a gas containing oxygen, the said gas in each case being passed, together with the gaseous products which are developed during decomposition of the decomposable silver salts, through the bed of catalyst particles under activation.

In the preferred embodiment of this process, the product emanating from the drying stage is treated initially raising to a temperature of 300° to 310°C in the presence of pure nitrogen, recycling through the catalyst such gases and gaseous products as develop from decomposition of the silver salts, delivering from 0.1 to 30 l/hr and per g of product, these conditions being maintained for a period of time ranging from 1 to 10 hours. Subsequently, while the temperature is maintained at between 270° and 350°C and preferably between 300° and 310°C, oxygen is added to the gaseous mixture in ever-increasing quantities, until the oxygen content is equal to 20% by volume of the mixture itself, this in a period of time not less than five hours and preferably ranging from 7 to 10 hours.

Also during this treatment, the gases are recycled through the bed of catalyst particles at a speed ranging from 0.1 to 30 l/hr and per g of catalyst.

Preferably during this stage, the fraction of gaseous mixture corresponding to the quantity of oxygen gradually supplied is continuously extracted. The thermal treatment may be carried out at atmospheric pressure.

It is also possible to work at higher pressures, such as for example pressures up to 20 kg/sq.cm.

After cooling, the catalyst is ready to be used. The catalyst obtained in this way is characterised by high and constant activity and mechanical properties, which render it particularly suitable for use for long periods of time in the industrial production of ethylene oxide. We feel that these improvements are attributable to the action exerted by the gases which develop during the decomposition of the decomposable silver salts on the particles of catalyst during activation.

In addition to the above specified advantages, the present invention is characterised by the fact that operations can easily be automated. Another important advantage derives from the fact that the activation operations may be carried out directly in the reactor used for production of ethylene oxide.

In this way, the catalyst is directly activated in the reactor before the oxidation reaction, which considerably simplifies operation.

In a preferred form of embodiment of the process of the present invention, a fine suspension of carbon and at least one metal selected from the group consisting of: platinum, gold and palladium, is prepared in a solution of silver lactate in lactic acid.

This suspension is used to impregnate the inert and sub-divided support at a temperature ranging from 60° to 115°C.

Alumina, silicon carbide, magnesium oxide and combinations of these materials are used as supports, particularly in spheres of a diameter ranging from 4 to 9 mm. The impregnated particles are then dried in a stream of air at a temperature rising to a maximum level not exceeding 160°C, in periods ranging from 3 to 20 hours. The product obtained is then subjected to the above-described activation treatment. The quantities of compounds used are such that the final catalysts contain a quantity of silver, calculated as a metal, ranging from 7 to 30% by weight with respect to the support, while the quantities of platinum, gold and palladium, may range from 0.01 to 1% by weight with respect to the metallic agent. In another form of embodiment, the support is initially impregnated at a temperature of 15° to 40°C with an aqueous suspension comprising silver oxide and at least one metal or metallic oxide chosen from the class comprising the metals platinum, palladium, gold, barium and calcium, followed by drying as above.

The dried particles are then impregnated by an aqueous solution comprising one or more organic acids chosen from the group comprising acetic acid, tartaric acid, lactic acid, citric acid, maleic acid and isomaleic acid and possibly silver salts of one or more of the said acids, followed by drying at a temperature ranging from 60° to 160°C at atmospheric pressure or at pressures below atmospheric pressure. Activation is then carried out according to the process of the present invention.

According to another form of embodiment, the support is firstly impregnated by one or preferably several inert organic liquids having a boiling point ranging from 150° to 330°C.

The particles obtained are then impregnated by a solution comprising lactic acid and silver lactate, and subjected to drying at a temperature ranging from 60° to 160°C and then to activation.

The catalysts activated according to the process which is the object of the present invention permit of a production of ethylene oxide equal to or greater than 285 g/kg of catalyst and per hour with not less than 70% selectivity of the ethylene converted.

The invention will now be illustrated by the following examples which do not however set out to impose any limitation thereon.

EXAMPLE 1 (for comparison)

500 mg carbon with 5% by weight of platinum are added to 15.7 g lactic acid (80% purity). Then, 8.5 g silver oxide are added, the temperature starting out at approximately 90°C. The result is a solution of silver lactate in lactic acid, containing a fine suspension of platinised carbon. 50 g of small alumina spheres with an average diameter of approximately 7.1 mm, macroporous with a total pore volume equal to 44%, mean pore diameter equal to 100 microns, were placed in a rotating evaporator at a temperature of 90°C, to which the suspension described was added; the result was then left to cool to room temperature. In the test, alpha-alumina was used, having been activated by being heated to 1,100°C and having a surface area of less than 1 sq.m./gr.

The impregnated spheres were made to roll slowly at 90°C by passing 50 l/hr of air over them; the temperature was then gradually raised over 16 hours up to 120°C. The flow of air was then replaced by a flow of nitrogen, the throughout rate still being maintained at 50 l/hr, while the temperature was increased rapidly up to 300°C.

A small quantity of air was then introduced so that the oxygen content of the mixture equalled 0.2% by volume, the catalyst being maintained under these conditions for 9 hours.

The nitrogen was then completely replaced by air, the rate of addition of the air itself being regulated to a period equal to 7 hours so that the temperature was always kept at 300°C. The catalyst was cooled and discharged and was then ready to be used.

31.3 g of the catalyst prepared as above were introduced into a stainless steel tube 7.9 mm in diameter and 61.5 cm high. The tube was externally heated by oil at 269°C. 257 N.l/hr. of a gaseous mixture of the following:

| | |
|---|---|
| — ethylene | 9.28% |
| — nitrogen | 84.60% |
| — oxygen | 6.00% |
| — ethane | 0.12% | were then supplied to the said tube. 228 g ethylene oxide per kg of catalyst and per hour were collected, with a 70% selectivity of converted ethylene.

EXAMPLE 2

The catalyst was prepared as in Example 1 up to the drying stage. The catalyst was activated by bringing the impregnated spheres into a stainless steel tube 2.54 cm in diameter which was then heated in 2 hours to a temperature of 300°C at a pressure of 2kg/sq.cm. of nitrogen, the nitrogen and the gases developing being recycled at the rate of 1500 N.l/hr.

A little oxygen was then introduced into the recycling, the temperature being maintained below 310°C, a corresponding quantity of gas being discharged so as to maintain the pressure at 2 kg/sq.cm.

The quantity of oxygen added was regulated in such a way as to achieve a concentration of 20% by volume in 8 hours. The catalyst was cooled and discharged and was then ready to be used. 31.3 g of the catalyst prepared as above were introduced into a stainless steel tube 7.9 mm in diameter and 61.5 cm high. The tube was externally heated with oil at 269°C. 257 N.l/hr of a gaseous mixture composed as in Example 1 were then supplied to the said tube.

285 g ethylene oxide were collected for every kg of catalyst and for every hour, with 70% selectivity of converted ethylene.

We claim:

1. Process for the production of silver-based supported catalysts which can be used in the oxidation of ethylene to produce ethylene oxide, by impregnation of an inert and granular alumina support with a member selected from the group consisting of (1) a decomposable silver carboxylate which upon heating decomposes to yield gases, (2) a suspension of carbon and at least one metal selected from the group consisting of platinum, gold, and palladium in a solution of silver lactate in lactic acid, and (3) initially an aqueous suspension comprising silver oxide and (a) at least one metal or metallic oxide selected from the group consisting of platinum, palladium and gold, or (b) at least one oxide selected from the group consisting of barium and calcium, followed by drying, and then impregnated with an aqueous solution comprising one or more organic acids selected from the group consisting of acetic, tartaric, lactic, citric, maleic, and isomaleic, drying the impregnated particles and carrying out a heat treatment of the dried product at elevated temperature, characterized in that the said heat treatment is carried out:

by raising the particles of dried catalyst to a temperature ranging from 270 to 350°C in a nitrogen atmosphere, while the nitrogen and the gases which develop from decomposition of the decomposable silver salts are recycled through the particles of catalyst at the rate of 0.1 to 30 l/hr and per g of catalyst and for a period of 1 to 10 hours;

followed by the addition to the gaseous mixture of oxygen, its final content being brought to 20% in a period of not less than 5 hours, the gaseous mixture still being kept flowing through the particles of catalyst at a rate of 0.1 to 30 l/hr and per g of catalyst.

2. Process according to claim 1, characterised in that the heat treatment is carried out at a temperature of 300° to 310°C.

3. Process according to claim 1, characterised in that the heat treatment is carried out in a period of time ranging from 7 to 10 hours.

4. Process according to claim 1, characterised in that the heat treatment is carried out at a gas pressure of up to 20 kg/sq.cm.

5. Process according to claim 1, wherein said metal suspended with carbon in a solution of silver lactate in lactic acid is platinum.

* * * * *